May 31, 1955  W. A. BEDFORD, JR  2,709,286
TRIM MOLDING FASTENER
Filed April 21, 1952
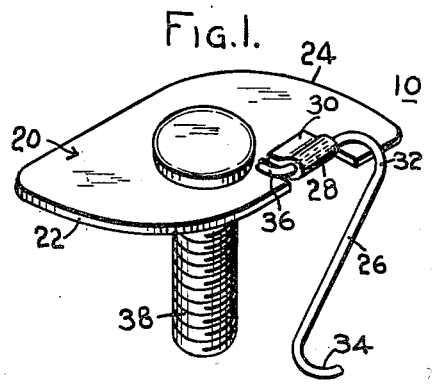
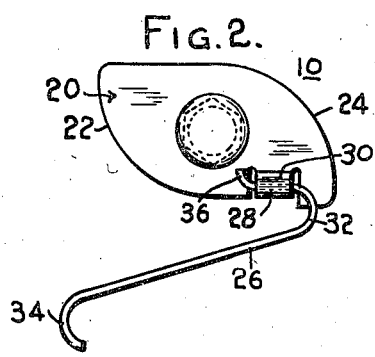
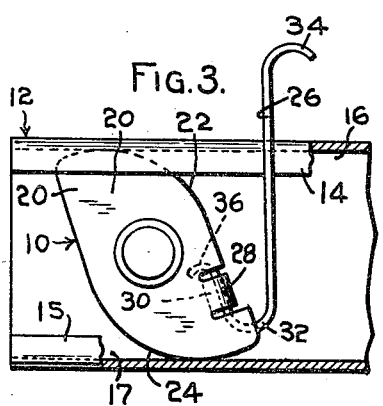
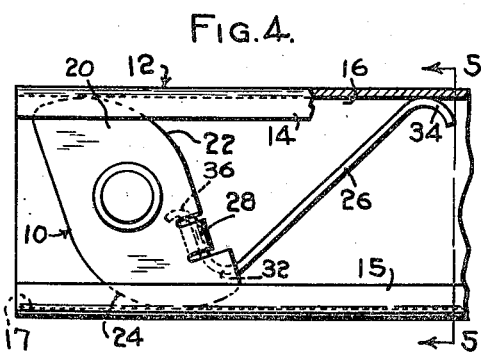
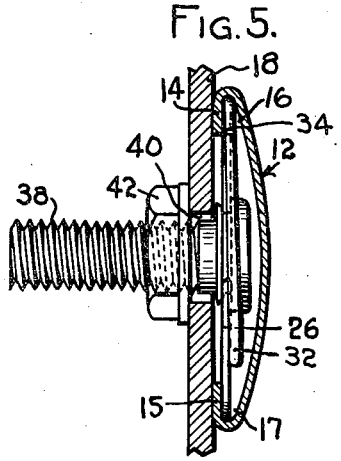
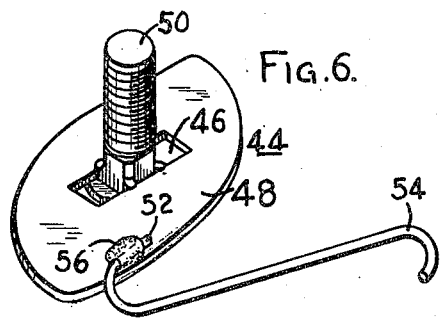
INVENTOR:
WILLIAM A. BEDFORD JR,
BY Robert E Ross
AGENT.

United States Patent Office 2,709,286
Patented May 31, 1955

2,709,286

TRIM MOLDING FASTENER

William A. Bedford, Jr., North Scituate, Mass., assignor, by mesne assignments, to United-Carr Fastener Corporation, Boston, Mass., a corporation of Delaware Application April 21, 1952, Serial No. 283,479

1 Claim. (Cl. 24—73)

This application is a continuation-in-part of my application Serial No. 197,052, filed November 22, 1950.

This invention relates generally to fastening devices, and has particular reference to a fastener for attaching a channeled molding to a support.

In the construction of automobiles and the like, trim molding is commonly secured to portions of the body by fastening devices which span the distance between inturned edges of the molding and have a bolt or other means disposed thereon for entering an opening in the body. Since it is desirable to have a particular fastener fit as many different sizes of moldings as possible, and since many types of moldings are tapered so as to have a uniformly varying width throughout their length, it has been found necessary to design such fasteners so as to be adjustable to accommodate as great a variation in width as possible. Such fasteners are commonly provided with a bearing plate which is more or less elongated, with diagonally opposite corners rounded so that the plate may be rotated into position in moldings of various sizes, with the rounded corners passing behind the inturned edges to provide a smooth bearing surface over a wide range of molding widths. In one type of fastener for this purpose, an integral tongue or arm is provided which extends from the plate, and is adapted to be flexed into a position behind an edge of the molding to rotatably urge the plate ends into engagement with opposite edge portions of the molding. Such fasteners have been widely used in such installations, but they have a number of disadvantages which have prevented their use with certain types of moldings. In large moldings, the plate frequently has insufficient strength to resist the forces imparted thereto when a bolt is tightened onto the nut during assembly of the fastener onto the support. This lack of strength can be corrected to some degree by providing embossments in the plate, however, in such fasteners the most effective method of providing maximum strength, that is, by forming the plate of a strong metal such as high carbon heat treated steel, cannot be used, since in such cases the arm portion of the device is either too stiff to be sprung into place, or else it is so brittle that it breaks rather than flexes. Such construction has also required that the spring arm be disposed generally flatwise to the plane of the cross piece to attain the desired flexibility, and hence the arm necessarily protrudes from the plane of the plate at the junction therewith. For this reason such fasteners cannot be used in small shallow moldings.

The object of this invention is to provide an improved molding fastener which overcomes the above difficulties, so that the fastener has adequate strength and is capable of assembly into small moldings.

Referring to the drawing, there is illustrated a molding fastener 10, which is adapted for assembly into a molding 12 which has inturned edge portions 14 and 15 forming opposing recesses 16 and 17, to enable the molding to be attached to a support 18.

The fastener 10 comprises generally a cross plate 20, which is preferably flat and unembossed, and is formed of high strength metal such as hardened high carbon steel. The plate 20 is elongated, and has diagonally opposite rounded corners to provide smooth bearing surfaces 22 and 24 to enable the cross plate to be rotated into position in moldings of various widths as will appear hereinafter.

To provide means for urging the cross plate into the proper position, a spring arm 26 is assembled therewith. The spring arm 26 is preferably formed of resilient wire and in the illustrated embodiment is generally S shaped. One end portion 28 of the arm 26 is attached to the plate 20 by means of a tongue 30 formed from the plate which is curled around said end portion. The wire extends from the tongue to a reverse bend portion 32 and then upwardly alongside the plate to terminate in a free end portion 34. On the opposite side of the tongue, the end 36 is bent to extend angularly to the portion enclosed by the tongue. The end 36, in conjunction with the portion of the reverse bend 32 which is superimposed on the plate, operates to prevent rotation of the arm in the tongue, so that the arm cannot move any appreciable distance in a direction perpendicular to the plane of the plate. To permit attachment of the assembled fastener and molding to the support, a bolt 38 is assembled with the plate so as to protrude outwardly therefrom.

To assemble the fastener into the molding, the cross plate 20 is placed between the edge portions 14 and 15 and rotated so that the ends of the plate pass into the opposing recesses 16 and 17, and the rounded bearing surfaces 22 and 24 of the plate seat in the bottom of the recesses (see Fig. 2). The spring arm 26 may then be flexed away from the base until the free end 34 can pass under the adjacent inturned edge 14 to seat in the recess 16 (see Fig. 3). The spring action of the arm tends to rotate the cross plate into tighter engagement with the opposite edge portions of the molding to retain the ends thereof in the recesses. The molding may then be placed against the support so that the bolt 38 enters an opening 40 therein, to receive a nut 42, to retain the assembly in position on the support.

The use of a non-integral spring arm permits the fastener to have certain desirable characteristics not possible with prior fasteners in which the arm is integral with the cross plate. In the illustrated embodiment, the cross plate is flat, without the usual embossments for strength, since in the fastener herein described, the plate may be formed of hardened high strength metal such as high carbon steel. Such construction permits the greatest strength with the least overall thickness of material thereby permitting assembly of the fastener into small moldings, and eliminates the need for embossing tools in the manufacture of the plate. The spring arm may be formed of resilient wire and since the wire must be attached prior to the heat treatment of the plate it may be formed of steel having a lower carbon content than the plate so it is not hardened to as great an extent as the plate in the hardening operation. Hence, after heat treatment, the plate is extremely strong, and the wire is considerably weaker, although it will have sufficient resiliency to rotatably urge the cross plate into position as hereinbefore described. The relative weakness of the wire is another important advantage of the device. The spring arm is required only to rotatably urge the cross plate so that the ends thereof are maintained in the recesses, and its strength should be no greater than that required to perform this function, since otherwise the fastener is more difficult to assemble. The greater ease of assembly of the illustrated fastener is of great importance on automobile assembly lines, where one operator may assemble hundreds of fasteners per day.

The use of the separate spring arm formed of wire also permits the use of the fastener in moldings of different widths with greater ease, since the wire of which the spring is formed is easily deformed beyond its elastic limit, if necessary to facilitate assembly of the fastener into narrow moldings, yet has sufficient springback to enter the recess and urge the cross plate into proper engagement with the molding.

It will be understood that the illustrated method of attaching the spring arm to the cross plate is exemplary only, since other methods may be used. In some cases it may be desirable to spot weld the spring arm to the cross plate, and the arm will still be considered to be non-integral in the sense in which the word is used in the appended claims, in that the arm and the cross plate are formed of metals of a different composition, and assembled by some convenient means, as distinguished from prior construction in which the arm and the cross plate are formed as a unitary body from a single piece of sheet metal.

A modified form of the device is shown in Fig. 6, which illustrates a fastener 44, which is similar in construction to the fastener 10, with the added feature that an elongated slot 46 is provided in the plate 48, so that the bolt 50 assembled therein is movable relative to the plate, and the end 52 of the spring 54 is secured to the plate by a spot welding 56 as described above.

Since certain other obvious modifications may be made in the device without departing from the scope of the invention, it is intended that all matter contained herein be interpreted in an illustrative and not a limiting sense.

I claim:

A fastening device for assembly with a strip of molding or the like having inturned flanges along the side edges thereof forming opposing recesses, said device comprising an elongated cross plate for spanning the distance between the inturned edges, said cross plate having substantially similar eccentric arcuate end portions progressing outwardly in the same direction of hand from root to terminal tip portions, and adapted to enter the opposed recesses, said cross plate having side edges joining said arcuate end portions root to tip, and a non-integral spring arm assembled therewith along a side edge thereof, at a point spaced from but adjacent to a terminal tip portion, said plate having a tongue member curled over a portion of one of said side edges and back against the plate near an end of said spring arm, portions of said arm on each side of said tongue extending angularly in relation to the portion enclosed by the tongue and being superimposed on the plate to prevent rotation of the arm in the curled over tongue, said arm extending outwardly from the plate and generally alongside the plate substantially parallel to the plane thereof to terminate in a free end portion which is movable away from the plate for engagement with an adjacent edge portion of the molding to rotatably urge the plate ends into engagement with the opposite edge portions of the molding, the free end portion and the portion enclosed by the tongue being connected by a reverse bend portion.

References Cited in the file of this patent
UNITED STATES PATENTS

| | | |
|---|---|---|
| 603,158 | Stephenson | Apr. 26, 1898 |
| 2,208,008 | McLaughlin | July 16, 1940 |
| 2,254,310 | Place | Sept. 2, 1941 |
| 2,515,895 | Poupitch | July 18, 1950 |
| 2,531,351 | Churchill | Nov. 21, 1950 |
| 2,531,352 | Churchill | Nov. 21, 1950 |
| 2,604,776 | Goldsmith | July 29, 1952 |